United States Patent
Brost et al.

(10) Patent No.: US 7,703,506 B2
(45) Date of Patent: Apr. 27, 2010

(54) EXHAUST HEAT EXCHANGER

(75) Inventors: Viktor Brost, Aichtal (DE); Martin Wierse, Frickenhausen (DE); Christoph Ruf, Metzingen (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 11/105,715

(22) Filed: Apr. 14, 2005

(65) Prior Publication Data

US 2005/0230091 A1 Oct. 20, 2005

(30) Foreign Application Priority Data

Apr. 15, 2004 (DE) .................. 10 2004 018 197

(51) Int. Cl.
F28D 7/16 (2006.01)

(52) U.S. Cl. ..................... 165/157; 165/166

(58) Field of Classification Search .......... 165/152, 165/153, 157, 159, 160, 166
See application file for complete search history.

(56) References Cited

U.S. PATENT DOCUMENTS

| | | | |
|---|---|---|---|
| 1,296,058 A | 3/1919 | Fedders | |
| 2,408,846 A | 10/1946 | Golden et al. | |
| 4,257,554 A | 3/1981 | Willingham | |
| 4,688,631 A * | 8/1987 | Peze et al. | 165/166 |
| 5,129,473 A | 7/1992 | Boyer | |
| 5,597,038 A | 1/1997 | Potier | |
| 5,845,612 A | 12/1998 | Lakerdas et al. | |
| 5,931,219 A * | 8/1999 | Kull et al. | 165/51 |
| 6,247,523 B1 * | 6/2001 | Shibagaki et al. | 165/51 |
| 6,311,678 B1 * | 11/2001 | Lepoutre | 123/568.12 |
| 6,378,603 B1 | 4/2002 | Shimoya et al. | |
| 6,397,597 B1 | 6/2002 | Gartner | |
| 6,892,797 B2 | 5/2005 | Beddome et al. | |
| 6,910,528 B2 * | 6/2005 | Abiko et al. | 165/166 |
| 7,204,302 B2 | 4/2007 | Shibagaki et al. | |
| 2001/0052231 A1 * | 12/2001 | Ryan | 60/39.511 |
| 2003/0010479 A1 * | 1/2003 | Hayashi et al. | 165/157 |
| 2003/0010480 A1 * | 1/2003 | Shibagaki et al. | 165/158 |
| 2003/0056532 A1 * | 3/2003 | Dickson et al. | 62/471 |
| 2003/0116305 A1 * | 6/2003 | Beddome et al. | 165/81 |
| 2004/0003916 A1 | 1/2004 | Nash et al. | |

FOREIGN PATENT DOCUMENTS

| | | |
|---|---|---|
| DE | 19902504 | 8/2000 |
| DE | 19930416 | 1/2001 |
| DE | 10061949 | 6/2001 |
| JP | 09280118 | 10/1997 |
| JP | 11-13554 * | 1/1999 |
| WO | 2005088219 | 9/2005 |

* cited by examiner

Primary Examiner—Teresa J Walberg
(74) Attorney, Agent, or Firm—Michael Best & Friedrich LLP

(57) ABSTRACT

An exhaust heat exchanger for an exhaust gas recirculation system, including a first flow path for the intake air for an internal combustion engine, a second flow path for the exhaust of an internal combustion engine, and a housing enclosing the first and second flow paths. The first and second flow paths are each divided into a plurality of flow channels in heat-conducting, metallically connected contact with each other, and the flow channels include elements promoting heat exchange between the flow channels.

18 Claims, 4 Drawing Sheets

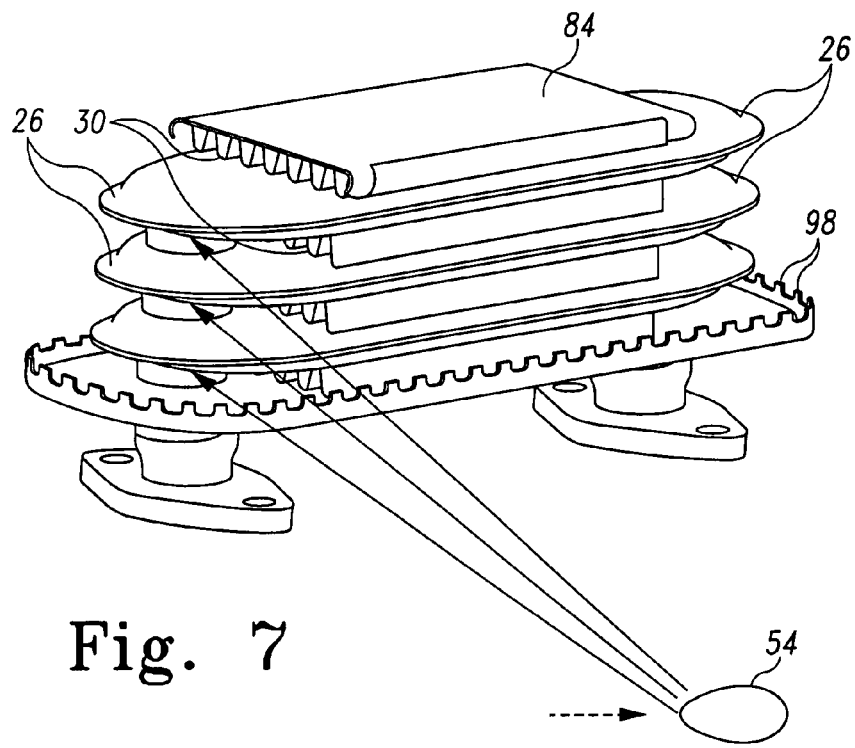
Fig. 7
Fig. 8
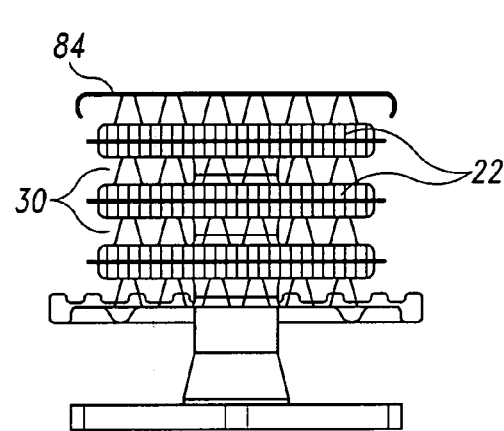
Fig. 9

EXHAUST HEAT EXCHANGER

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to an exhaust heat exchanger for an exhaust gas recirculation system, and more particularly to an exhaust heat exchanger in which exhaust being returned for combustion again in the cylinder of an internal combustion engine is cooled by the intake air stream of the internal combustion engine.

BACKGROUND OF THE INVENTION AND TECHNICAL PROBLEMS POSED BY THE PRIOR ART

Exhaust heat exchangers in exhaust gas recirculation systems often use the liquid coolant of the internal combustion engine to cool the exhaust gas. However, air that is heated in heat exchange with the exhaust and then used to heat the passenger compartment is often used in vehicle heating. An exhaust heat exchanger in an exhaust gas recirculation system is disclosed in U.S. Pat. No. 2,408,846, where the surrounding air cools exhaust air by flowing around the housing of the exhaust heat exchanger provided with cooling ribs on the outside. Also, DE 199 30 416 A teaches a cooling device in which the exhaust recirculation line is passed through the intake line of the internal combustion engine in order to cool the exhaust with the intake air.

The present invention is directed toward improving upon exhaust heat exchangers which use intake air.

SUMMARY OF THE INVENTION

In one aspect of the present invention, an exhaust heat exchanger for an exhaust gas recirculation system is provided, including a first flow path for the intake air for an internal combustion engine, a second flow path for the exhaust of an internal combustion engine, and a housing enclosing the first and second flow paths. The first and second flow paths are each divided into a plurality of flow channels in heat-conducting, metallically connected contact with each other, and the flow channels include elements promoting heat exchange between the flow channels.

In one form of this aspect of the present invention, the flow channels of the second flow path are flat tubes assembled from two half shells. In a further form, the flat tubes have two openings in their broad sides and are stacked one on the other with a spacing therebetween with the one openings connected to each other to form an exhaust inlet channel, and the other openings connected to each other to form an exhaust outlet channel. In one still further form, the housing comprises a housing cap enclosing the stack of flat tubes and a metallic bottom plate to which the housing cap is secured, and the bottom plate has an inlet opening and an outlet opening for the exhaust, the inlet opening being connected to the exhaust inlet channel and the outlet opening being connected to the exhaust outlet channel. In another still further form, the flow channels of the first flow path are arranged in the spacing between the individual flat tubes. In yet another still further form, the exhaust inlet channel and the exhaust outlet channel have a non-circular shape favorable to flow in order to keep pressure loss on the intake air side low.

In another form of this aspect of the present invention, the elements promoting heat exchange in the flow channels of the first flow path comprise corrugated ribs in heat-conducting contact with the flow channels of the second flow path.

In still another form of this aspect of the present invention, the metallically connected contacts are joined by soldering.

In yet another form of this aspect of the present invention, the housing comprises a housing cap enclosing the stack of flat tubes and a metallic bottom plate to which the housing cap is secured. In further forms, the housing cap is plastic, or the flow channels of the first flow path adjacent to one of the housing cap and the bottom plate include baffles. In another further form, the housing cap has an inlet and an outlet for intake air, and in a still further form the flat tubes are flattened, at least on the end facing the intake air inlet in the housing cap whereby pressure loss of the intake air is maintained low. In yet another further form, the housing cap has an edge which is mechanically connected to the bottom plate, and in a still further form at least one continuous recess is in the bottom plate in the vicinity of the edge.

BRIEF DESCRIPTION OF THE DRAWINGS

FIG. 7 is a perspective view of a second embodiment of the heat exchanger according to the present invention;

FIG. 8 is a cross-sectional illustration of the shape of an exhaust inlet channel; and FIG. 9 is a side view of the heat exchanger of FIG. 7.

DETAILED DESCRIPTION OF THE INVENTION

Figure 1:
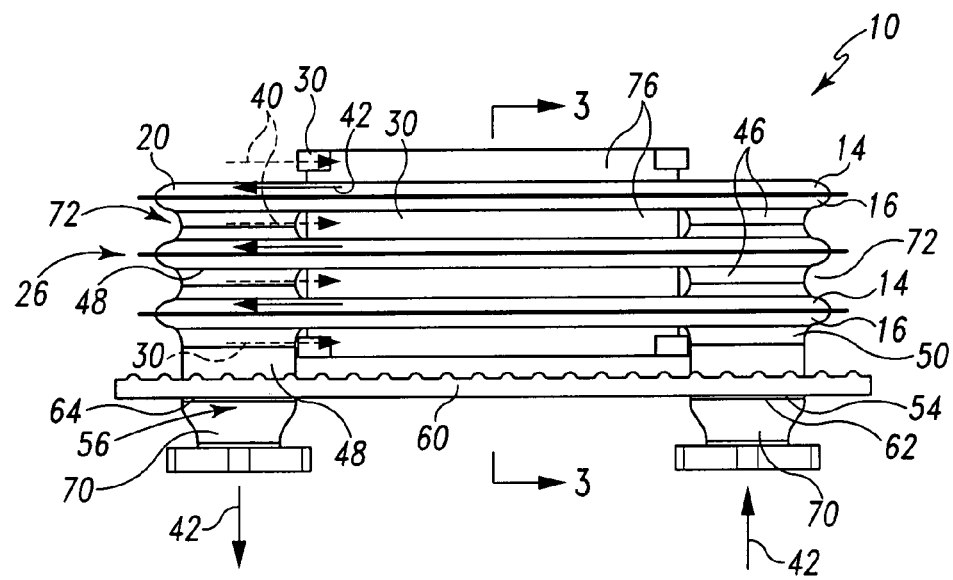
FIG. 1 is a front view of the exhaust heat exchanger according to the present invention, without the housing cap.

An exhaust heat exchanger 10 according to the present invention is illustrated in FIG. 1, and includes flat tube-half shells 14, 16 with connected edge sections 18 to effectively form a flat tube 20 defining flow channels 22. In the illustrated embodiment, both half shells 14, 16 are flattened on both opposite ends 26 so that a shape favorable for flow is created that leads to a limited pressure loss of the intake air flowing through flow channels 30.

Flow of intake air is illustrated by the dashed arrows 40 in FIG. 1, with the solid arrows 42 illustrating flow of exhaust. In the illustrated heat exchanger 10, the flow path for the intake air is divided into four flow channels 30 and the flow path for the exhaust is divided into three flow channels 22. However, it should be understood that the number of flow channels 22, 30 in itself is naturally not subject to any restrictions, although in the illustrated embodiment it may be advantageous (because of spatial conditions) to keep the number of flow channels 22, 30 low and to address higher performance requirements by, for example, longer flow channels 22, 30 and/or by altered flow patterns.

The half shells 14, 16 forming the flat tubes 20 have two openings 46, 48, with a collar 50 suitably molded onto the edge of the openings 46, 48 with a slightly conical design. The collars 50 of adjacent flat tubes are suitably secured together, for example, by inserting one into the other, so that an inlet channel 54 and an outlet channel 56 for the exhaust is created.

Figure 5:
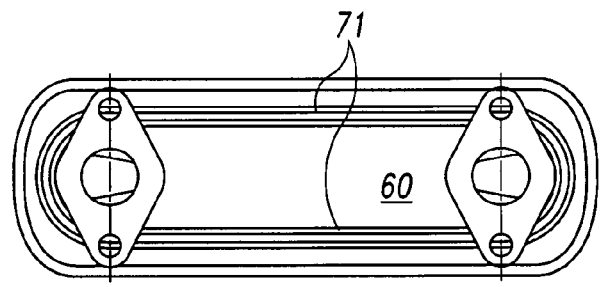
FIG. 5 illustrates the bottom plate of the exhaust heat exchanger.

A bottom plate 60 of the exhaust heat exchanger includes an inlet opening 62 and an outlet opening 64 that are aligned with the inlet channel 54 and the outlet channel 56. The inlet opening 62 and the outlet opening 64 each have a corresponding collar 50 that can be combined with the collar 50 on the openings 46, 48 of the adjacent flat tube. A connection flange 70 applied to the bottom plate 60 lies on the same line for connection of an exhaust recirculation line only indicated (as illustrated schematically in FIG. 6). A continuous recess 71 (see FIGS. 3 and 5) may be advantageously provided in the bottom plate 60 to increase its rigidity, and further to slightly suppress heat conduction outward in the direction of housing cap.

A spacing 72 remains between the flat tubes 20 in which the mentioned flow channels 30 for intake air are formed. Corrugated ribs 76 are situated in the intake air flow channels 30 and internal inserts 78 are inserted into the exhaust flow channels 22. The wave direction of the corrugated ribs 76 may advantageously be across the flow direction of the intake air so that the intake air must flow through the channels 80 formed by the corrugated ribs 76. At least the outer wave flanks of corrugated ribs 76 may be smooth and designed closed. Heat radiation to the housing or housing cap (which may be plastic) is therefore advantageously somewhat reduced.

It should be appreciated that the internal inserts 78 may also be beads or the like molded into the broad sides 81 of the flat tubes.

Figure 2:
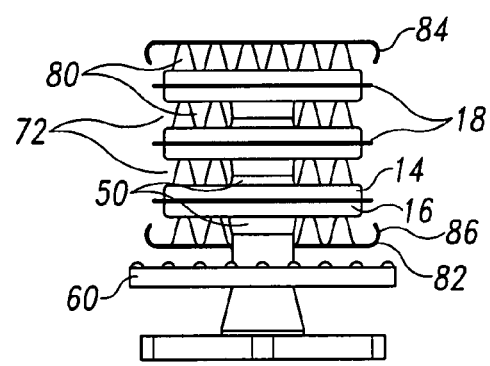
FIG. 2 is a side view of the heat exchanger of FIG. 1.
Figure 3:
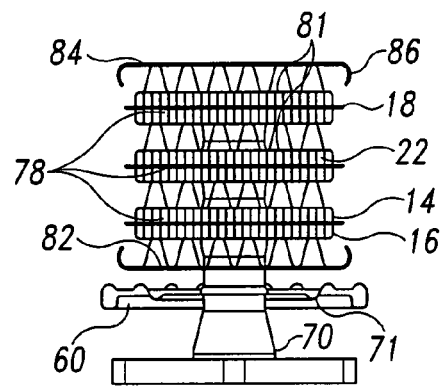
FIG. 3 is a cross-sectional view along line 3-3 of FIG. 1.

An advantageous design of the upper and lower (in the orientation of the figures) flow channels 30 for the intake air is particularly apparent from FIGS. 2 and 3, with the corrugated ribs 76 arranged in these two flow channels 30 each having a baffle 82 or 84 bent on the long edges 86. These baffles 82, 84 on the one hand divert the intake air through the corrugated ribs 76 and on the adjacent flow channel 22 and therefore make heat exchange more intensive there. On the other hand, the baffles 82, 84 contribute to suppressing heat radiation outward in the direction toward the housing cap 90 (see FIG. 6).

It should be appreciated that the metallic individual parts of the exhaust heat exchanger 10, like the corrugated ribs 76, the flat tubes 20 (or preferably the flat tube half shells 14, 16, the internal insert 78, the bottom plate 60, and the baffles 82, 84 may be advantageously made from an appropriate stainless steel sheet, suitably produced, for example, by deformation dies on deformation machines. The heat exchanger 10 may be manufactured by assembling these metallic parts and then joining them together in a soldering process.

Figure 4:
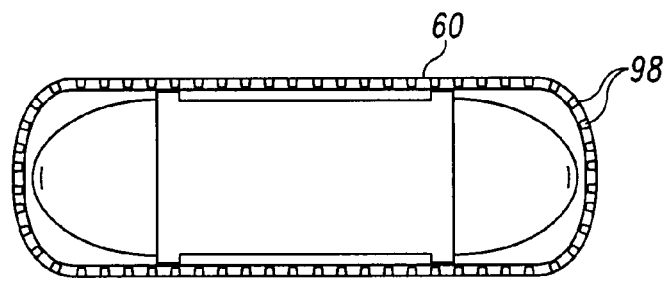
FIG. 4 is a top view of the heat exchanger of FIG. 1.
Figure 6:
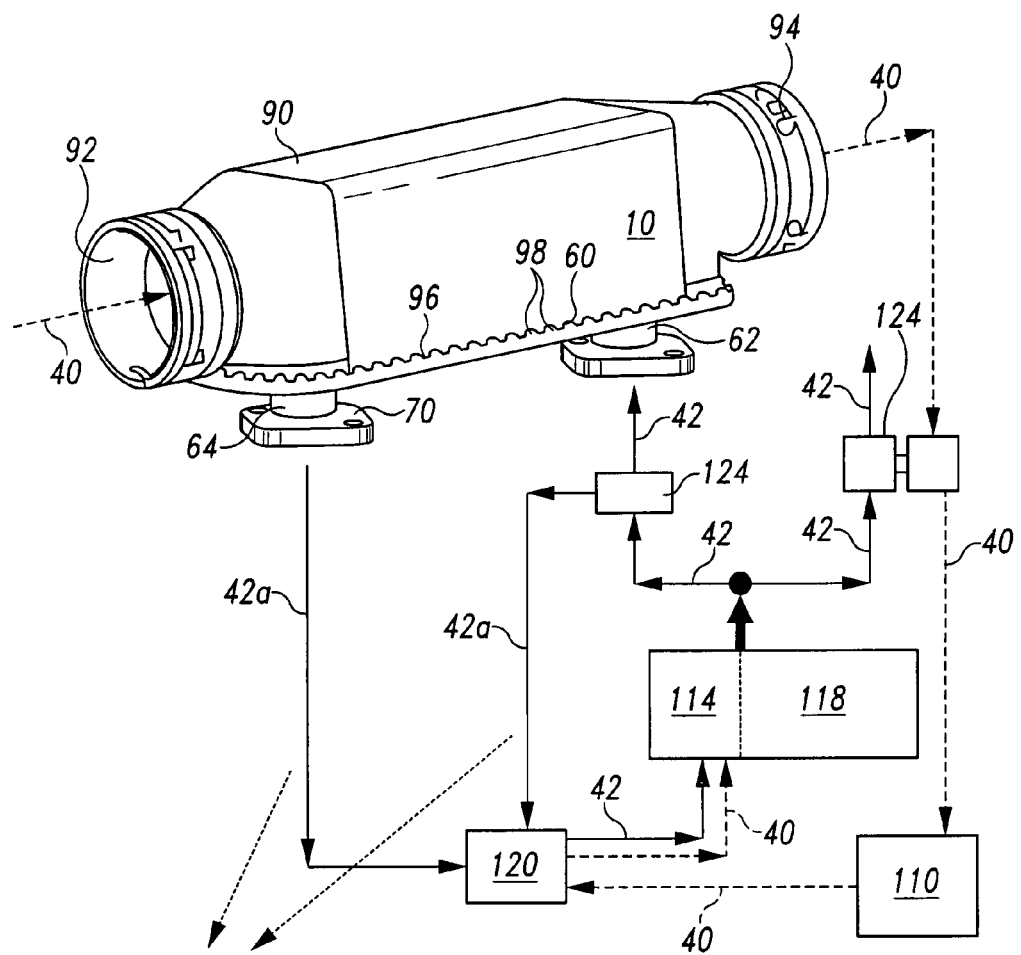
FIG. 6 is a perspective view of the exhaust heat exchanger of the present invention, with the housing cap and a schematic illustration of a system with which the heat exchanger may be used.

The exhaust heat exchanger 10 is illustrated in FIG. 6 with the housing cap 90, with an intake air inlet 92 and, on the other end, an air intake outlet 94. The housing cap 90 may be advantageously mounted after the soldering process, with the edge 96 of the housing cap 90 mechanically connected to the edge of the bottom plate 60. The connection is produced by deformation of protrusion 98 on the edge of bottom plate 60. The bent protrusions 98 lie on a shoulder on the edge 96 of the housing cap 90 and secure the connection (see FIG. 4). If desired and/or necessary, a seal may be provided in the connection.

As previously noted, the housing cap 90 may be advantageously made of plastic, thereby assisting in desirably keeping the weight of the exhaust heat exchanger 10 low.

FIG. 6 also illustrates an exemplary arrangement for exhaust recirculation with which the present invention may be used is illustrated, with input air and exhaust flow indicated by the dashed arrows 40 and the solid arrows 42. The exhaust heat exchanger 10 according to the present invention may be advantageously incorporated into this type or into a differently-equipped exhaust gas recirculation system. In this example, after heat exchange with the exhaust in the heat exchanger 10, the intake air then flows through a charge air cooler 110 before being introduced to the cylinders 114 of the internal combustion engine 118 as combustion air, mixed with the recirculated exhaust output from an EGR valve 120. An exhaust valve flap 124 may be provided between the engine 118 and the exhaust inlet 62 of the heat exchanger 10 to divert exhaust either into the heat exchanger 10 or to recirculate directly back to the EGR valve 120. In either case, the exhaust is recirculated for combustion again in the engine cylinders 114. Arrows 42a illustrate recirculation lines for exhaust. Residual exhaust may also be output from the engine 118 through a turbocharger 124.

FIGS. 7-9 illustrate an alternate embodiment of a heat exchanger incorporating the present invention. It should be appreciated from this embodiment that the corrugated rib 76 of the outer (lower) intake air flow channel 20 may be connected directly to the bottom plate 60 (in which case, the lower baffle 82 (see FIG. 3) may be left out.

It is desirable that the cross-section of the inlet channel 54 and the outlet channel 56 for the exhaust be designed, to the extend possible, so that the pressure loss on the intake air side does not exceed a tolerable level. A favorable teardrop shape of the cross section in this respect between the flow paths 22 is schematically depicted in FIG. 8, with the channels 54, 56 created by joining the collars 50, as previously discussed, with the collars being such a shape.

It should thus be appreciated that the exhaust heat exchanger of the present invention does not operate using the coolant of the internal combustion engine but, in similar fashion to it, helps to improve exhaust recirculation (i.e., can contribute to reducing fuel consumption of the internal combustion engine and reducing emissions).

Moreover, use of intake air as coolant as with the present invention is advantageous since operating situations of internal combustion engines, which often require no cooling of the exhaust, can be dealt with more easily. A simple air flap or bypass valve, which need not be integrated in the exhaust heat exchanger according to the present invention, is sufficient to send the intake air through the exhaust heat exchanger, or to divert it around it, depending upon the needs of the engine design. Since the intake air flowing through the intake line of the internal combustion engine has a relatively low temperature, an air flap operating as a bypass valve avoids the functional problems which can occur in integrated exhaust-bypass valves as a result of the extremely high temperatures in such other exhaust heat exchangers. However, it should be understood that the provision of bypass channels for the exhaust integrated in the exhaust heat exchanger is not absolutely necessary within the broad scope of some aspects of the present invention either.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. An exhaust heat exchanger for an exhaust gas recirculation system, comprising:
    a first flow path for intake air for an internal combustion engine;
    a second flow path for exhaust of an internal combustion engine; and
    a housing enclosing said first and second flow paths;
    wherein said first and second flow paths are each divided into a plurality of flow channels in heat-conducting, metallically connected contact with each other, said flow channels including elements promoting heat exchange between the flow channels;
    wherein the housing includes a plastic housing cover enclosing a stack of flat tubes and a metallic bottom plate to which the housing cover is secured; and
    wherein a baffle is supported in the housing between the stack of tubes and the housing cover to direct the intake air across the elements promoting heat exchange of the first flow path and to direct heat inwardly toward the stack of flat tubes and away from the housing cover, the baffle extending along the stack of tubes in a dimension substantially parallel to the flow of intake air through the flow channels.

2. The exhaust heat exchanger of claim 1, wherein the flow channels of said second flow path are flat tubes assembled from two half shells.

3. The device of claim 2, wherein said flat tubes have two openings in their broad sides and are stacked one on the other with a spacing therebetween with the one openings connected to each other to form an exhaust inlet channel, and the other openings connected to each other to form an exhaust outlet channel.

4. The exhaust heat exchanger of claim 3, wherein the bottom plate has an inlet opening and an outlet opening for the exhaust, said inlet opening being connected to said exhaust inlet channel and said outlet opening being connected to the exhaust outlet channel.

5. The exhaust heat exchanger of claim 3, wherein the flow channels of said first flow path are arranged in the spacing between the individual flat tubes.

6. The exhaust heat exchanger of claim 3, wherein said exhaust inlet channel and said exhaust outlet channel have a non-circular shape favorable to flow in order to keep pressure loss on the intake air side low.

7. The exhaust heat exchanger of claim 1, wherein said elements promoting heat exchange in the flow channels of the first flow path comprise corrugated ribs in heat-conducting contact with the flow channels of the second flow path.

8. The exhaust heat exchanger of claim 1, wherein the metallically connected contacts are joined by soldering.

9. The exhaust heat exchanger of claim 1, wherein said housing cover has an inlet and an outlet for intake air.

10. The exhaust heat exchanger of claim 9, wherein the flat tubes are flattened, at least on the end facing the intake air inlet in the housing cover whereby pressure loss of the intake air is maintained low.

11. The exhaust heat exchanger of claim 1, wherein said housing cover has an edge which is mechanically connected to the bottom plate.

12. The exhaust heat exchanger of claim 11, further comprising at least one continuous recess in the bottom plate in the vicinity of said edge.

13. The exhaust heat exchanger of claim 1, wherein the flow channels of the first flow path adjacent to one of the housing cover and the bottom plate include baffles.

14. An exhaust heat exchanger for an exhaust gas recirculation system, comprising:
    a first flow path for intake air for an internal combustion engine;
    a second flow path for exhaust of an internal combustion engine; and
    a housing enclosing said first and second flow paths;
    wherein said first and second flow paths are each divided into a plurality of flow channels in heat-conducting, metallically connected contact with each other, said flow channels including elements promoting heat exchange between the flow channels;
    wherein the housing includes a plastic housing cover enclosing a stack of flat tubes and a metallic bottom plate, the housing cover defining an opening having edges connected to the periphery of the bottom plate; and
    wherein a baffle is supported in the housing between the stack of tubes and the housing cover to direct the intake air across the elements promoting heat exchange of the first flow path and to direct heat inwardly toward the stack of flat tubes and away from the housing cover.

15. The exhaust heat exchanger of claim 14, wherein the housing cover includes an inlet and an outlet for the first flow path and the bottom plate includes an inlet and outlet for the second flow path.

16. The exhaust heat exchanger of claim 14, wherein the flow channels of the first flow path adjacent to the housing cover include baffles which extend along the stack of tubes in a dimension substantially parallel to the flow of intake air through the flow channels.

17. The exhaust heat exchanger of claim 14, wherein protrusions formed in the bottom plate are bent around the edges of the housing cover to mechanically connect the bottom plate to the cover.

18. The exhaust heat exchanger of claim 17, further comprising at least one continuous recess in the bottom plate in the vicinity of said edge.

* * * * *